Nov. 6, 1951  E. P. SHEPARD  2,573,994
FILM POSITION INDICATOR FOR MOTION-PICTURE CAMERAS
Filed June 22, 1948
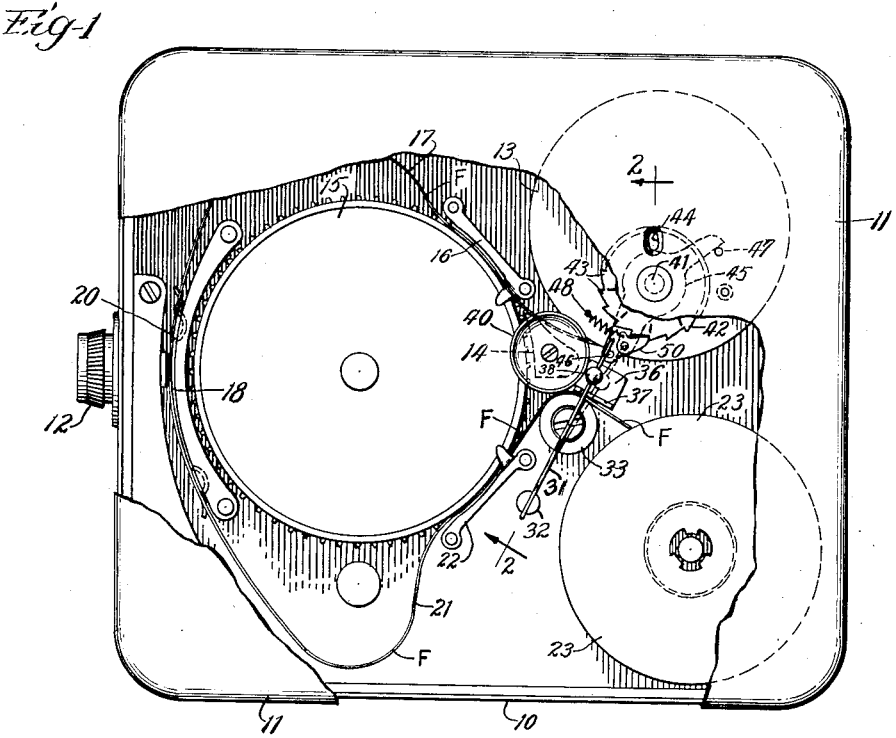
Inventor:
Emerson Paul Shepard.
By Mann and Brown
Attys.

Patented Nov. 6, 1951

2,573,994

UNITED STATES PATENT OFFICE 2,573,994

FILM POSITION INDICATOR FOR MOTION-PICTURE CAMERAS

Emerson Paul Shepard, Chillicothe, Ohio

Application June 22, 1948, Serial No. 34,537

7 Claims. (Cl. 116—114)

My invention relates to motion picture cameras with special reference to cameras for amateurs, and is directed to the problem of ascertaining the point in the progress of the film at which the user may start exposure of the film and/or the point at which the user should stop photographing scenes.

A length of film supplied in roll form for loading motion picture cameras has a main light-sensitive portion and a portion at one or both ends thereof, which end portion is termed a leader. Leaders serve to protect the main portion of the film from exposure to light when the film is in roll form before and after use in the camera, and one leader is employed, of course, for initially threading the film into the camera mechanism. Usually the film leader is a strip of non-sensitive opaque material attached to the end of the light-sensitive portion of the film, but in some instances may be simply an integral continuation of the light-sensitive portion of the film.

It is disappointing to the user of a camera to go through the motions of exposing a scene only to discover later that part or all of the exposure was made either before or after the light-sensitive portion of the film had passed through the exposure plane of the camera.

To avoid this disappointment users commonly run the camera mechanism without exposure for a liberal period of time immediately after loading the camera, and later stop exposing the film long before the end of the light-sensitive portion is reached. Such precautions are excessively wasteful of film, and moreover, are not always successful since the user may underestimate the amount of film exposed and thereby fail to stop using the camera before the end of the light-sensitive portion of the film is reached.

Certain mechanical expedients have been proposed and used heretofore in attempts to solve this problem. One expedient, for example, is a footage meter or indicator that is directly driven by the moving leader and film. Usually the footage meter imposes on the user the burden of setting or resetting the metering mechanism when loading the camera, and, in practice, the meter is neither sufficiently accurate nor sufficiently reliable even with great care on the part of the user. Another mechanical expedient of even less accuracy is the type of footage meter that rests against the periphery of a roll of film in the camera to respond to changes in the radial dimension of the roll.

The general object of my invention is to meet this problem successfully in a relatively simple but reliable and highly accurate manner. My solution involves a signal means responsive directly to the film movement. While the signal means may be operated either for audible perception alone or for visual perception alone, I prefer to provide both audible and visual signals. In the preferred practice of my invention the audible signal operates at the beginning and against the end of the light-sensitive portion of the film, and the visual signal is changed at such times to indicate which portion of the film is currently passing through the focal plane of the camera.

In general these objects are attained by cutting or forming the film to provide a transverse engagement edge or surface and arranging means in the path of the transverse edge or surface for engagement thereby to actuate a suitable signal means. In the preferred practice of my invention the transverse engagement surface or edge is provided by cutting a notch in the edge of the film, and a yieldingly mounted member is biased to enter the notch. Upon entering the notch subsequent movement of the film displaces the yielding means a suitable distance and then the yielding means is released for return movement to its normal position. The signal means is operated by movement of the yielding means.

Further objects and advantages of the invention will be apparent in the following description and the accompanying drawing.

In the drawing, which is to be regarded as merely illustrative:

Fig. 1 is a side elevation of a typical amateur motion picture camera incorporating my invention, portions of the camera wall being broken away to reveal normally concealed parts;

Fig. 2 is a section on a slightly enlarged scale, taken as indicated by the broken line 2—2 of Fig. 1;

Fig. 3 is a face view of a portion of a typical motion picture film adapted to the practice of my invention; and Fig. 4 is a perspective view of what may be termed a stationary release cam employed in the camera.

Fig. 1 shows a typical amateur motion picture camera comprising a box-like casing 10 with a removable cover 11, the casing being equipped with the usual lens 12. Film F is led from a supply spool 13 past a triangular guide 14, into engagement with a sprocket 15 under an upper sprocket clamp 16, and is then formed into a loop 17 prior to entering the slot 18 of the gate 20 at the focal plane of the lens 12. Beyond the gate 20 the film F is formed into a second loop 21 and then is led again into engagement with the sprocket 15 under a lower sprocket clamp 22, the film finally reaching a take-up spool 23. The elements of the camera listed to this point are conventional.

For the purpose of practicing the present invention the film F may be conventional except for the provision of a laterally extending edge or surface at the beginning and/or at the end of the light-sensitive portion of the film, the laterally extending surface or edge being indicative of the juncture between the light-sensitive portion of the film and the corresponding leader. It is contemplated that the transverse surface or edge will engage means for actuating the signal as the film juncture approaches the focal plane of the camera, and therefore the transverse surface or edge will be displaced from the actual film juncture longitudinally of the film by the distance of the actuating means from the camera focal plane, the distance being measured along the film.

Fig. 3, by way of example, shows a film F with a main light-sensitive portion 25 and a leader 26 attached thereto at the juncture 27. It is contemplated that the signal actuating means will be spaced from the focal plane of the lens along the film by a distance A in Fig. 3, and therefore at that distance from the juncture 27 the film is provided with the required lateral edge or surface.

While the required laterally extending edge or surface may be provided in various ways, I prefer the simple expedient of cutting out a portion of the film. In this instance I cut a notch or recess 28 in the margin of the film, one edge 30 of the margin constituting the laterally extending engagement surface or edge.

In the present form of the invention the actuating means of the mechanism comprises a flexible arm 31 in the form of a short length of spring wire suitably mounted on a rigid post 32. The wire 31 may be termed a yielding means or a yieldingly mounted resilient means. It is important to note that such a piece of spring wire may be displaced or flexed universally in a plane perpendicular thereto, and if the moving film passes the wire in substantially such a plane the wire may be flexed either longitudinally or laterally of the moving film. To provide such a positional relationship between the wire 31 and the moving film, the film is led around the peripheral surface of a cylindrical guide 33 and the wire is extended substantially diametrically of the guide, as best shown in Fig. 1. It will be noted in Fig. 2 that the cylindrical guide 33 is of lesser dimension than the width of the film, so that the indicating notch 28 will be exposed for cooperation with the spring wire.

Wire 31 is held by post 32 in such a position that it is biased laterally with respect to the film so as to bear against edge 35 of the film. Longitudinally of the film, wire 31 is held so as to normally be positioned at the foot of a cam surface 37 (hereinafter described). The positioning and biasing may be accomplished by the angle at which wire 31 is held by post 32 with respect to the path of the film of guide 33. The normal position of wire 31, when the film is in the camera, is illustrated in Figs. 1 and 2. Since wire 31 is biased to press lightly against edge 35 of the film, the wire will slip into notch 28 when that notch has moved longitudinally into a position laterally opposite the wire.

When the wire 31 enters the notch 28 the engagement edge 30 is carried against the wire by continued movement of the film, thereby flexing or displacing the free end of the wire in the direction of film movement. Preferably suitable means is provided to automatically disengage the wire from the notch at the end of the predetermined displacement by the film. The releasing means, for example, may be a stationary cam 36, in the form of an angular piece of sheet metal, best shown in Fig. 4. In the course of displacement or flexure of the yieldingly mounted resilient means or wire 31 by the notch 28 in the moving film, the wire rides along the inclined cam surface 37 of the stationary cam 36 and is thereby progressively shifted laterally out of engagement with the edge 30 of the notch. Upon release from the notch the wire 31 snaps back toward its normal position. It is apparent that the wire derives from the moving film energy which may be used for actuating the required signal means, and that the energy may be transmitted to the signal means on either of the two movements of the wire.

In the present construction the wire carries a small clapper or metal body 38, positioned to strike a suitably stationary bell 40 on the release or return movement of the wire. The present construction further provides for actuating a visual signal means by the initial displacement or flexure of the wire 31, as will now be described.

Rotatably mounted on a suitable spindle 41 is a ratchet wheel 42, having ratchet teeth 43. The face of the ratchet wheel is divided into alternate radial zones distinctively colored, preferably white zones alternating with red zones. Each of the zones corresponds to one of the ratchet teeth 43. A small window 44 is provided in the camera casing to make the indicating zones of the disc 42 visible in sequence, suitable precautions being taken against the leakage of light into the camera proper. Also rotatably mounted on the spindle 41 is a lever 45, one arm of which carries an actuating pin 46 and the other arm of which is adapted to move against a fixed stop pin 47, the lever being biased against the stop pin by a suitable light spring 48. As best shown in Fig. 2 the actuating pin 46 is positioned to intersect the path of flexure of the spring arm 31 in the direction of the film movement.

A small pawl 50 is pivotally mounted on the actuating lever 55 and is suitably biased for engagement with the periphery of the ratchet wheel 42 so that reciprocation of the lever will cause intermittent rotation of the ratchet wheel. Thus each flexure of the wire arm 31 in the direction of film travel will cause the ratchet wheel to advance by one tooth, thereby to change the color visible through the window 44. It is contemplated that a red zone of the ratchet wheel at the window will indicate that one of the two leaders is in the focal plane of the camera, and a white zone will indicate that the main or light-sensitive portion of the film is at the focal plane.

The operation of the device will be readily understood from the foregoing description. With the leading end of the first leader of a fresh roll of film initially threaded into the camera mechanism in the usual manner, and with a red zone of the ratchet wheel 42 visible through the window 44, the operator, before attempting to take a picture, runs the film-advancing mechanism until the bell 40 is rung by the action of the first notch 28, the notch that indicates the juncture between the leader and the leading end of the film proper. The passing of the first notch 28 flexes the wire arm 31, and in doing so causes the arm 31 to move against the actuating pin 46. The resultant movement of the lever 45 carrying the pawl 50 causes the ratchet wheel to advance by one tooth, thereby shifting a white zone of the ratchet wheel to the window 44. When the flexed spring arm 31 is released by the stationary cam 36 the clapper 38 is carried against the bell 40 by the return movement of the wire arm.

When the second notch 28 at the end of the film proper reaches the wire arm 31, again the ratchet wheel is advanced to change the color in the window 44 from white to red and the bell sounds to warn the operator of the camera.

It is to be noted that no setting or resetting of the movable parts of the invention are necessary, only the usual manipulations being required. When a used film is removed from the camera, the ratchet wheel has a red zone at the window 44, and, of course, such position of the ratchet wheel is desired during initial movement of the next film that is used in the camera.

The preferred practice of my invention disclosed herein for the purpose of disclosure and to illustrate the principles involved will suggest to those skilled in the art various changes and substitutions within the scope of my appended claims.

I claim:

1. In combination, a motion picture camera adapted to use a film therein having a main light-sensitive portion, at least one end portion and a transverse engagement surface indicative of the juncture between said two portions, resilient means yieldingly mounted adjacent said film and biased toward a position in the path of said engagement surface for engagement therewith to be displaced thereby in the direction of film movement approximately when said juncture approaches the focal plane of the camera, cam means adjacent said resilient means adapted to bear on said resilient means to release said resilient means from said engagement surface for return movement, and film-position indicating means responsive to displacement and release of said resilient means.

2. In a motion picture camera having means to move film past a position of exposure, said film having a main light-sensitive portion, at least one end portion and a recess indicative of the juncture between said main portion and said end portion, yielding means biased toward the path of said recess to enter the recess and to be displaced in the direction of film movement by engagement therein as the film moves, cam means adjacent said yielding means to overcome said bias for removal of said yielding means from said recess after such displacement of the yielding means thereby to release the yielding means for return movement, and signal means responsive to movement of said yielding means.

3. In a motion picture camera having means to move film in one direction past a position of exposure, said film having a main light-sensitive portion, at least one end portion and a notch in communication with a side edge thereof, said notch being indicative of the juncture between said main portion and said end portion, and means for indicating when said juncture is approximately at said position of exposure, said indicating means including a wire spring adjacent the path of the film through the camera with one end thereof rigidly mounted on said camera in such a manner that another portion of said spring in the original position is biased lightly against said edge of the film whereby the wire will be engaged in the notch when the two are laterally opposite each other, an inclined cam having a low point opposite the wire in the original position and a high point slightly removed therefrom in the direction of movement of the film, said low point being inwardly from said edge of the film and said high point being outwardly from said edge of the film whereby after said wire has become engaged in said notch the continued movement of the film will move the wire longitudinally into engagement with the cam and the latter will force the wire laterally out of the notch to allow the wire to return to its original position.

4. In a motion picture camera having means to move film in one direction past a position of exposure, said film having a main light-sensitive portion, at least one end portion and a notch in communication with a side edge thereof, said notch being indicative of the juncture between said main portion and said end portion, and means for indicating when said juncture is approximately at said position of exposure, said indicating means including a resilient means yieldingly mounted adjacent said film and biased toward a position in the path of said film to engage said notch for movement of said resilient means in the direction of film movement when said notch and said resilient means are laterally opposite each other, an inclined cam adapted to urge the resilient means out of said notch, after movement of the notch and resilient means a predetermined distance, for releasing said resilient means from said notch, an audible film position indicator actuated by the release of said resilient member, and a visual film position indicator operable by the movement of said resilient means in the direction of film travel.

5. In a motion picture camera having means to move film in one direction past a position of exposure, said film having a main light-sensitive portion, at least one end portion and a recess in communication with a side edge thereof, said recess being indicative of the juncture between said main portion and said end portion, and means for indicating when said juncture is approximately at said position of exposure, said indicating means including a resilient means yieldingly mounted adjacent said film and biased toward a position in the path of said film to engage said recess for movement of said resilient means in the direction of film movement when said recess and said resilient means are laterally opposite each other, cam means to remove said resilient means from said recess after the resilient means has been moved in the direction of film travel, and a film positioning indicator operatively connected with said resilient means for energization by movement of the resilient means.

6. In a motion picture camera having means to move film in one direction past a position of exposure, said film having a main light-sensitive portion, at least one end portion and a recess in communication with a side edge thereof, said recess being indicative of the juncture between said main portion and said end portion, and means for indicating when said juncture is approximately at said position of exposure, said indicating means including a resilient means yieldingly mounted adjacent said film and biased toward a position in the path of said film to engage said recess for movement of said resilient means in the direction of film movement when said recess and said resilient means are laterally opposite each other, and an inclined cam adapted to urge the resilient means out of said recess after a predetermined movement of the recess and resilient means.

7. In a motion picture camera having means to move film in one direction past a position of exposure, said film having a main light-sensitive portion, at least one end portion and a notch in communication with a side edge thereof, said notch being indicative of the juncture between said main portion and said end portion, means for indicating when said juncture is approximately at said position of exposure, said indicating means including a wire spring adjacent the path of the film through the camera with one end thereof rigidly mounted on said camera in such a manner that another portion of said spring in the original position is biased lightly against said edge of the film whereby the wire will be engaged in the notch when the two are laterally opposite each other, and cam means for removing said spring from said notch after said wire has become engaged in said notch and moved a predetermined distance in the direction of film movement.

EMERSON PAUL SHEPARD.

REFERENCES CITED

The following references are of record in the file of this patent:

UNITED STATES PATENTS

| Number | Name | Date |
|---|---|---|
| 1,199,733 | Dietz | Sept. 26, 1916 |
| 1,224,500 | Pietzsch | May 1, 1917 |
| 1,959,268 | Goldhammer et al. | May 15, 1934 |
| 2,148,076 | Kirkman | Feb. 21, 1939 |
| 2,238,482 | Wittel | Apr. 15, 1941 |